United States Patent
Botsai et al.

(10) Patent No.: US 12,482,918 B2
(45) Date of Patent: Nov. 25, 2025

(54) USER-INSTALLABLE WIRELESS COMMUNICATIONS MODULE

(71) Applicant: Zebra Technologies Corporation, Lincolnshire, IL (US)

(72) Inventors: Kurt Botsai, Thousand Oaks, CA (US); Lawrence E. Smolenski, Newbury Park, CA (US); David L. Garbe, Ventura, CA (US); Sheila S Follett, Cornell, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/148,386

(22) Filed: Jan. 13, 2021

(65) Prior Publication Data
US 2022/0223997 A1 Jul. 14, 2022

(51) Int. Cl.
| | |
|---|---|
| *H01Q 1/22* | (2006.01) |
| *H01R 12/71* | (2011.01) |
| *H04B 1/3818* | (2015.01) |
| *H04W 88/02* | (2009.01) |

(52) U.S. Cl.
CPC ......... *H01Q 1/2275* (2013.01); *H01Q 1/2208* (2013.01); *H01R 12/716* (2013.01); *H04B 1/3818* (2015.01); *H04W 88/02* (2013.01)

(58) Field of Classification Search
CPC .. H01Q 1/2275; H01Q 1/2208; H04B 1/3818; H01R 12/716; H04W 88/02
See application file for complete search history.

(56) References Cited

U.S. PATENT DOCUMENTS

| | | | | |
|---|---|---|---|---|
| 4,649,264 A | * | 3/1987 | Carson | G07C 13/00 235/54 R |
| 5,300,938 A | * | 4/1994 | Maroun | H01Q 1/243 343/702 |

(Continued)

FOREIGN PATENT DOCUMENTS

| | | | |
|---|---|---|---|
| CN | 202309818 U | * | 7/2012 |
| CN | 210190881 U | | 3/2020 |

(Continued)

OTHER PUBLICATIONS

Quan et al., Analysis and Design of a Compact Dual-Band Directional Antenna, IEEE Antennas and Wireless Propagation Letters, V. 11, 2012, p. 547. (Year: 2012).*

(Continued)

*Primary Examiner* — Peter Radkowski

(57) ABSTRACT

An installable wireless communications module for a media processing device includes: a body configured for placement into a chamber of the media processing device, the body including an alignment feature configured to engage with a mating feature within the chamber; an electrical interface supported on the body and configured to engage with a connector of the media processing device disposed within the chamber; a communications controller supported on the body and connected with the electrical interface; an antenna support extending from the body and configured for receipt in a channel extending from the chamber of the media processing device; and an antenna affixed to the antenna support and electrically connected to the controller.

14 Claims, 10 Drawing Sheets

(56) References Cited

U.S. PATENT DOCUMENTS

| | | | | |
|---|---|---|---|---|
| 5,337,061 | A | * | 8/1994 | Pye .................. H01Q 1/242<br>343/702 |
| 5,907,545 | A | * | 5/1999 | Arai ................. H04B 1/7093<br>370/335 |
| 6,011,519 | A | * | 1/2000 | Sadler ................ H01Q 9/285<br>343/866 |
| 6,014,705 | A | * | 1/2000 | Koenck ............... H04L 12/12<br>709/200 |
| 6,067,583 | A | * | 5/2000 | Gilbert ............... H04M 1/725<br>710/14 |
| 6,115,762 | A | * | 9/2000 | Bell ................. H01Q 1/2275<br>343/702 |
| 6,249,254 | B1 | * | 6/2001 | Bateman .............. G06F 1/1626<br>343/702 |
| 6,259,409 | B1 | * | 7/2001 | Fulton ................ H01Q 1/244<br>343/702 |
| 6,295,207 | B1 | * | 9/2001 | Jones ................ G06F 1/1626<br>361/752 |
| 6,339,400 | B1 | * | 1/2002 | Flint ................. H01Q 1/2266<br>343/702 |
| 6,409,401 | B1 | * | 6/2002 | Petteruti .............. G07B 1/00<br>400/70 |
| 6,467,688 | B1 | * | 10/2002 | Goldman .............. B41J 3/36<br>235/441 |
| 6,518,937 | B2 | * | 2/2003 | Fang ................. H01Q 9/42<br>343/895 |
| 6,531,985 | B1 | * | 3/2003 | Jones ................ G06F 1/1616<br>343/702 |
| 6,538,606 | B2 | * | 3/2003 | Quinn ................ G06F 1/1656<br>343/702 |
| 6,554,402 | B2 | * | 4/2003 | Trafton .............. B41J 2/17513<br>347/49 |
| 6,570,538 | B2 | * | 5/2003 | Vaisanen .............. H01Q 21/28<br>343/702 |
| 6,593,853 | B1 | * | 7/2003 | Barrett ............... G06K 17/0025<br>340/572.1 |
| 6,593,952 | B1 | * | 7/2003 | Funayama ............. B41J 35/36<br>347/217 |
| 6,623,196 | B1 | * | 9/2003 | Lee .................. G03G 15/754<br>399/116 |
| 6,654,231 | B2 | * | 11/2003 | Teshima .............. G06F 1/1637<br>361/730 |
| 6,697,415 | B1 | * | 2/2004 | Mahany ............... H04W 52/46<br>455/88 |
| 6,717,801 | B1 | * | 4/2004 | Castell ............... H04M 1/0254<br>361/679.41 |
| 6,788,529 | B2 | * | 9/2004 | Homer ............... G06F 1/1698<br>361/756 |
| 6,830,181 | B1 | * | 12/2004 | Bennett .............. G06K 7/10881<br>235/462.46 |
| 6,856,285 | B2 | * | 2/2005 | Bettin ................ H01Q 9/0421<br>343/846 |
| 6,882,318 | B2 | * | 4/2005 | Nevermann ........... H01Q 9/0421<br>343/702 |
| 6,899,476 | B1 | * | 5/2005 | Barrus ............... G06K 19/07749<br>400/70 |
| 6,916,128 | B1 | * | 7/2005 | Petteruti ............. B41J 3/36<br>400/692 |
| 6,994,415 | B2 | * | 2/2006 | Asauchi ............. B41J 2/17546<br>347/19 |
| 7,037,119 | B2 | * | 5/2006 | Collins ............... H01Q 1/2275<br>439/131 |
| 7,089,973 | B2 | * | 8/2006 | Nicodem ............. B41J 2/17506<br>141/2 |
| 7,099,692 | B2 | * | 8/2006 | Lin .................. H04B 10/40<br>385/44 |
| 7,102,883 | B2 | * | 9/2006 | Hardt ................ G06F 1/184<br>361/679.58 |
| 7,130,670 | B2 | * | 10/2006 | Fifield ............... H05K 1/0237<br>439/43 |
| 7,140,713 | B2 | * | 11/2006 | Kawakami ........... B41J 29/393<br>347/19 |
| 7,142,886 | B2 | * | 11/2006 | Murayama ........... G06F 1/1616<br>455/575.8 |
| 7,154,746 | B1 | * | 12/2006 | Hanson .............. G06F 1/1632<br>361/679.55 |
| 7,167,726 | B2 | * | 1/2007 | Ghosh ............... G06F 1/1698<br>463/31 |
| 7,171,503 | B2 | * | 1/2007 | Lee .................. G06F 13/409<br>710/72 |
| 7,190,573 | B2 | * | 3/2007 | Lev .................. G06F 1/1616<br>361/679.55 |
| 7,230,580 | B1 | * | 6/2007 | Kelkar ............... H01P 11/00<br>343/870 |
| 7,267,421 | B2 | * | 9/2007 | Asauchi ............. B41J 2/17513<br>347/19 |
| 7,314,181 | B2 | * | 1/2008 | Lapstun ............. G06Q 30/0212<br>235/487 |
| 7,406,344 | B2 | * | 7/2008 | Fifield .............. H01Q 1/2266<br>439/43 |
| 7,436,532 | B2 | * | 10/2008 | Tsujimoto ........... G06F 3/1204<br>358/1.15 |
| 7,439,858 | B2 | * | 10/2008 | Feltz ................ G06K 7/10336<br>235/432 |
| 7,460,076 | B2 | * | 12/2008 | Hayes ................ H01Q 21/30<br>343/702 |
| 7,551,429 | B1 | * | 6/2009 | Hanson .............. G06F 1/1632<br>361/679.55 |
| 7,576,657 | B2 | * | 8/2009 | Duron ................ G06K 7/0008<br>455/41.1 |
| 7,609,406 | B2 | * | 10/2009 | Roth ................. B41J 3/44<br>235/462.46 |
| 7,628,181 | B2 | * | 12/2009 | Nicodem ............ B41J 2/17506<br>141/234 |
| 7,664,257 | B2 | * | 2/2010 | Hohberger ........... B41J 35/36<br>713/168 |
| 7,676,198 | B2 | * | 3/2010 | Mahany .............. H04B 1/692<br>370/335 |
| 7,841,790 | B2 | * | 11/2010 | Yamaguchi .......... B41J 15/044<br>400/613 |
| 7,843,344 | B2 | * | 11/2010 | Feltz ................ G06K 1/121<br>235/432 |
| 7,876,223 | B2 | * | 1/2011 | Yamaguchi ......... G06K 17/0025<br>340/572.1 |
| 7,903,033 | B2 | * | 3/2011 | Bellows .............. H01Q 1/242<br>343/702 |
| 7,921,553 | B2 | * | 4/2011 | Wojack .............. H04M 1/026<br>343/700 R |
| 7,928,917 | B1 | * | 4/2011 | Feldstein ............ H01Q 1/22<br>343/702 |
| 7,994,917 | B2 | * | 8/2011 | Hirota .............. G06K 17/00<br>340/572.1 |
| 8,002,196 | B2 | * | 8/2011 | Yu .................. G06K 19/07769<br>235/487 |
| 8,016,194 | B2 | * | 9/2011 | Hause ................ G06K 7/0004<br>235/384 |
| 8,038,069 | B2 | * | 10/2011 | Nagai ................ G06K 1/20<br>118/500 |
| 8,089,414 | B2 | * | 1/2012 | Feldstein ............ H01Q 1/007<br>343/702 |
| 8,154,574 | B2 | * | 4/2012 | Neuhard ............. B65C 11/021<br>347/222 |
| 8,258,929 | B2 | * | 9/2012 | Wirrig ............... G06K 1/121<br>340/10.5 |
| 8,270,149 | B2 | * | 9/2012 | Hanson ............. G06F 1/1656<br>361/679.56 |
| 8,301,886 | B2 | * | 10/2012 | Hohberger .......... B41J 17/36<br>713/168 |
| 8,369,892 | B2 | * | 2/2013 | Toyoshima ........ H04M 1/72412<br>348/231.3 |
| 8,432,567 | B2 | * | 4/2013 | Eberhardt, Jr. ..... G06K 17/0025<br>340/10.5 |
| 8,496,761 | B2 | * | 7/2013 | Kaneyama ......... G03F 7/70991<br>430/311 |
| 8,667,276 | B2 | * | 3/2014 | Hohberger ........... B41J 35/36<br>713/172 |
| 8,671,171 | B2 | * | 3/2014 | Skalsky ............. G06F 15/177<br>709/221 |

(56) References Cited

U.S. PATENT DOCUMENTS

| | | | |
|---|---|---|---|
| 8,754,816 B2* | 6/2014 | Feldstein | H01Q 1/22 343/702 |
| 9,049,641 B2* | 6/2015 | Wible | H04W 64/00 |
| 9,135,477 B2* | 9/2015 | Stern | G06K 7/10386 |
| 9,270,014 B2* | 2/2016 | Lin | H01Q 9/42 |
| 9,531,852 B2* | 12/2016 | Kim | H01Q 1/2266 |
| 9,539,834 B2* | 1/2017 | Tanaka | B41J 17/32 |
| 9,713,116 B2* | 7/2017 | Wible | H04W 64/00 |
| 9,887,448 B2* | 2/2018 | Forster | H01P 11/003 |
| 10,038,245 B2* | 7/2018 | Choi | H01Q 1/48 |
| 10,074,887 B2* | 9/2018 | Nivet | H01Q 1/2266 |
| 10,078,767 B2* | 9/2018 | Tsirline | H01Q 1/526 |
| 10,088,865 B1* | 10/2018 | Li | G06F 1/1635 |
| 10,109,908 B2* | 10/2018 | Youm | H01Q 1/38 |
| 10,234,493 B2* | 3/2019 | Matsumoto | H01Q 9/42 |
| 10,265,983 B2* | 4/2019 | Balcan | B41J 33/02 |
| 10,414,183 B2* | 9/2019 | Zeleny | B41J 29/02 |
| 10,528,774 B2* | 1/2020 | Tsirline | H01Q 1/2208 |
| 10,691,995 B2* | 6/2020 | Maeng | H05K 9/00 |
| 10,727,569 B2* | 7/2020 | Tsai | H04B 1/3827 |
| 10,770,793 B2* | 9/2020 | Ryoo | H01Q 5/35 |
| 10,785,378 B2* | 9/2020 | Katsuyama | G06F 3/1279 |
| 10,807,395 B2* | 10/2020 | Preliasco | B41J 17/32 |
| 10,931,001 B2* | 2/2021 | Zhao | H01Q 21/28 |
| 10,982,875 B2* | 4/2021 | Myers | F24F 11/56 |
| 11,088,468 B2* | 8/2021 | Joung | H01Q 1/523 |
| 11,143,682 B2* | 10/2021 | Embleton | G06F 11/3006 |
| 11,145,958 B2* | 10/2021 | Tsai | H04B 1/3827 |
| 11,223,120 B2* | 1/2022 | Ueda | H01Q 1/38 |
| 11,515,621 B2* | 11/2022 | Ramasamy | H01Q 1/243 |
| 11,723,489 B2* | 8/2023 | Nivala | G08B 21/182 340/539.22 |
| 2001/0040528 A1* | 11/2001 | Vaisanen | H01Q 21/28 343/702 |
| 2002/0080565 A1* | 6/2002 | Teshima | G06F 1/1626 343/702 |
| 2002/0082048 A1* | 6/2002 | Toyoshima | H04B 1/3816 455/420 |
| 2002/0101378 A1* | 8/2002 | Quinn | H01Q 1/2266 343/702 |
| 2003/0038860 A1* | 2/2003 | Trafton | B41J 2/17553 347/49 |
| 2003/0092396 A1* | 5/2003 | Fifield | H05K 1/0237 455/81 |
| 2003/0184482 A1* | 10/2003 | Bettin | H01Q 1/38 343/702 |
| 2003/0198009 A1* | 10/2003 | Homer | G06F 1/1656 361/679.27 |
| 2003/0198010 A1* | 10/2003 | Homer | G06F 1/1637 361/679.55 |
| 2004/0018851 A1* | 1/2004 | Koenck | G06K 7/10851 455/418 |
| 2004/0051752 A1* | 3/2004 | Asauchi | B41J 2/17513 347/19 |
| 2004/0077312 A1* | 4/2004 | Lin | H04B 10/40 455/39 |
| 2004/0077352 A1* | 4/2004 | Mahany | H04B 1/692 455/426.2 |
| 2004/0077353 A1* | 4/2004 | Mahany | H04W 52/46 455/426.2 |
| 2004/0125039 A1* | 7/2004 | Sasaki | H04B 15/00 343/702 |
| 2004/0150562 A1 | 8/2004 | Paun | |
| 2004/0209646 A1* | 10/2004 | Murayama | G06F 1/1683 455/556.1 |
| 2004/0239706 A1* | 12/2004 | Kawakami | B41J 2/17546 347/7 |
| 2005/0034777 A1* | 2/2005 | Nicodem | B41J 2/17506 141/2 |
| 2005/0111015 A1* | 5/2005 | Tsujimoto | G06F 3/1208 358/1.9 |
| 2005/0135054 A1* | 6/2005 | Hardt | G06F 1/186 361/679.32 |
| 2005/0264597 A1* | 12/2005 | Asauchi | B41J 2/17513 347/19 |
| 2005/0275872 A1* | 12/2005 | Otsuki | H04N 1/00278 455/66.1 |
| 2005/0280537 A1* | 12/2005 | Feltz | G06K 1/121 340/572.1 |
| 2005/0280600 A1* | 12/2005 | Ishikawa | H01Q 1/2275 343/906 |
| 2006/0023251 A1* | 2/2006 | Petteruti | B41J 3/36 358/1.15 |
| 2006/0023409 A1* | 2/2006 | Lev | G06F 1/1616 361/679.55 |
| 2006/0071063 A1* | 4/2006 | Duckett | G06K 17/0025 400/23 |
| 2006/0077103 A1* | 4/2006 | Hayes | H01Q 1/22 343/702 |
| 2006/0149879 A1* | 7/2006 | Lee | G06F 13/409 710/300 |
| 2006/0191022 A1* | 8/2006 | Hohberger | B41J 17/36 726/30 |
| 2006/0214843 A1* | 9/2006 | Klein | G01W 1/08 374/E11.003 |
| 2006/0221363 A1* | 10/2006 | Roth | G06K 1/121 358/1.6 |
| 2006/0237546 A1* | 10/2006 | Lapstun | G06K 7/10623 235/494 |
| 2006/0289081 A1* | 12/2006 | Nicodem | B41J 2/17506 141/94 |
| 2007/0055289 A1* | 3/2007 | Scouten | A61B 90/14 606/130 |
| 2007/0057857 A1* | 3/2007 | Fifield | H05K 1/0237 343/702 |
| 2007/0141997 A1* | 6/2007 | Wulff | G06K 19/0723 340/572.1 |
| 2007/0176831 A1* | 8/2007 | Lagnado | G06F 1/1698 343/702 |
| 2007/0222609 A1* | 9/2007 | Duron | G06K 7/0008 340/572.7 |
| 2007/0285320 A1* | 12/2007 | Hayes | H01Q 21/30 343/702 |
| 2008/0038034 A1* | 2/2008 | Yamaguchi | B41J 15/044 400/76 |
| 2008/0079585 A1* | 4/2008 | Hirota | G06K 17/0025 340/572.1 |
| 2008/0122879 A1* | 5/2008 | Nicodem | B41J 2/17506 347/7 |
| 2008/0124162 A1* | 5/2008 | Yamaguchi | G06K 17/0025 400/76 |
| 2008/0251009 A1* | 10/2008 | Nagai | G06K 1/20 118/500 |
| 2009/0189770 A1* | 7/2009 | Wirrig | G06K 7/0008 340/572.8 |
| 2009/0224039 A1* | 9/2009 | Hause | G06K 7/0004 235/385 |
| 2009/0268402 A1* | 10/2009 | Hanson | G06F 1/1626 361/679.56 |
| 2009/0314829 A1* | 12/2009 | McAllistor | G06K 7/10544 235/375 |
| 2010/0019882 A1* | 1/2010 | Stern | G06K 7/0008 340/10.1 |
| 2010/0024669 A1* | 2/2010 | Feltz | G06K 7/10079 101/212 |
| 2010/0076583 A1* | 3/2010 | Wojack | H04M 1/026 700/196 |
| 2010/0103238 A1* | 4/2010 | Neuhard | B65C 11/021 347/109 |
| 2010/0158077 A1* | 6/2010 | Mahany | H04B 1/406 375/132 |
| 2010/0190116 A1* | 7/2010 | Kaneyama | G03F 7/70991 427/352 |
| 2010/0190446 A1 | 7/2010 | Minami | |
| 2010/0234070 A1* | 9/2010 | Li | H04B 1/3816 455/90.3 |
| 2010/0283584 A1* | 11/2010 | McAllister | B65C 11/006 340/10.1 |

(56) References Cited

U.S. PATENT DOCUMENTS

| | | | |
|---|---|---|---|
| 2010/0284531 A1* | 11/2010 | Hohberger | H04L 9/3226 713/168 |
| 2010/0328702 A1* | 12/2010 | Eberhardt, Jr. | G06K 17/00 340/10.5 |
| 2011/0018689 A1* | 1/2011 | McAllister | B65C 9/1865 340/10.1 |
| 2012/0226907 A1* | 9/2012 | Hohberger | G07F 7/12 713/168 |
| 2013/0193209 A1* | 8/2013 | Tsirline | G06K 7/086 235/449 |
| 2013/0257712 A1* | 10/2013 | Imamura | G06F 1/1658 345/156 |
| 2013/0267247 A1* | 10/2013 | Wible | H04W 48/04 455/456.2 |
| 2014/0034739 A1* | 2/2014 | Forster | G06K 19/07718 235/492 |
| 2014/0062798 A1* | 3/2014 | Lin | H01Q 9/42 343/702 |
| 2014/0362576 A1* | 12/2014 | Degner | G02B 6/0001 362/253 |
| 2015/0082744 A1* | 3/2015 | Tanaka | B65B 61/025 53/131.5 |
| 2015/0195807 A1* | 7/2015 | Wible | H04W 52/0235 455/456.4 |
| 2015/0288055 A1* | 10/2015 | Youm | H01Q 9/42 343/702 |
| 2016/0069943 A1* | 3/2016 | Matsumoto | H01Q 5/385 324/149 |
| 2016/0197403 A1* | 7/2016 | Choi | H01Q 5/364 343/700 MS |
| 2016/0248893 A1* | 8/2016 | Kim | H04M 1/026 |
| 2017/0250465 A1* | 8/2017 | Wakasugi | H01Q 1/3283 |
| 2018/0006354 A1* | 1/2018 | Nivet | G06F 1/1698 |
| 2018/0056686 A1* | 3/2018 | Zeleny | B41J 29/393 |
| 2018/0175484 A1* | 6/2018 | Tsai | H04B 1/3827 |
| 2019/0049143 A1* | 2/2019 | Myers | F24F 13/20 |
| 2019/0138760 A1* | 5/2019 | Tsirline | G06K 7/086 |
| 2019/0198995 A1* | 6/2019 | Ryoo | H01Q 1/243 |
| 2019/0207323 A1* | 7/2019 | Joung | H01Q 1/523 |
| 2019/0236433 A1* | 8/2019 | Maeng | H01Q 1/52 |
| 2019/0289150 A1* | 9/2019 | Katsuyama | H04N 1/00541 |
| 2020/0129006 A1* | 4/2020 | Nivala | G08B 21/24 |
| 2020/0303810 A1* | 9/2020 | Tsai | H01Q 1/243 |
| 2020/0324703 A1* | 10/2020 | De Wind | B60R 1/12 |
| 2021/0018546 A1* | 1/2021 | Embleton | G06F 1/182 |
| 2021/0175610 A1* | 6/2021 | Ramasamy | H01Q 1/2266 |
| 2021/0320428 A1* | 10/2021 | Joung | H01Q 25/00 |

FOREIGN PATENT DOCUMENTS

| | | | | | |
|---|---|---|---|---|---|
| JP | 2003300359 | A | * | 10/2003 | B41J 2/17513 |
| JP | 2004009624 | A | | 1/2004 | |
| JP | 2004223830 | A | * | 8/2004 | |
| JP | 2004268515 | A | * | 9/2004 | |
| JP | 2006181803 | A | * | 7/2006 | |
| JP | 3826062 | B2 | * | 9/2006 | B41J 2/17513 |
| JP | 2007001066 | A | * | 1/2007 | |
| JP | 2007041390 | A | * | 2/2007 | |
| JP | 3953389 | B2 | * | 8/2007 | |
| JP | 2008168590 | A | | 7/2008 | |
| JP | 2008213232 | A | | 9/2008 | |
| JP | 2012076358 | A | | 4/2012 | |
| JP | 2019059111 | A | | 4/2019 | |
| JP | 2019111712 | A | | 7/2019 | |
| JP | 2021108315 | A | | 7/2021 | |

OTHER PUBLICATIONS

English language translation of JP-2006181803-A (Year: 2006).*
English language translation of JP-2004223830-A (Year: 2004).*
English language translation of CN-202309818-U (Year: 2012).*
Combined Search and Examination Report for Great Britain Patent Application No. 2200129.1 mailed Jun. 20, 2022.
Novelty Search Report for Belgian Application No. 2022/5020 mailed on Oct. 12, 2022.
Office Action for Chinese Application No. 202210031612.1 mailed on Jul. 3, 2023.
Combined Search and Examination Report for Great Britain Patent Application No. 2200129.1 mailed on Jul. 21, 2023.
Chinese patent application No. 202210031612.1 User-Installable Wireless Communications Module, Zebra Technologies Corporation applicant, Rejection Decision of May 29, 2024.

* cited by examiner

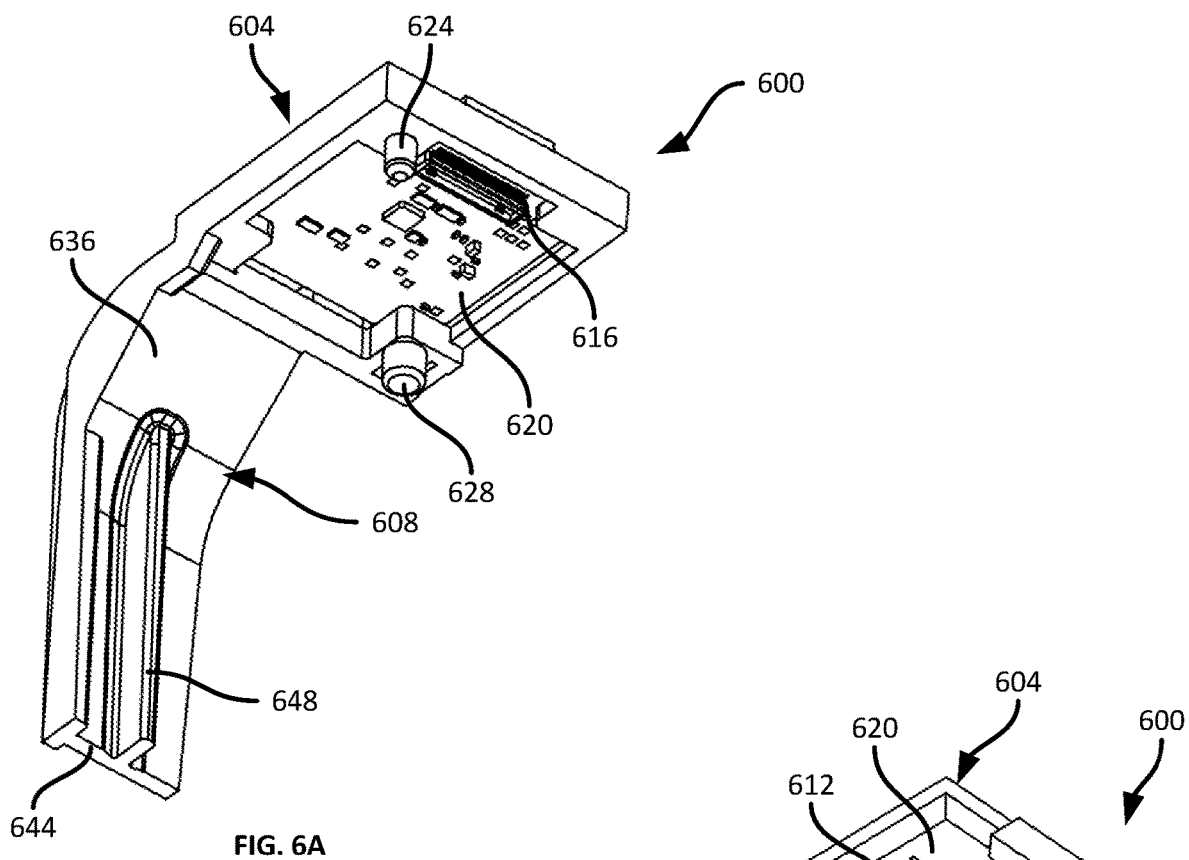
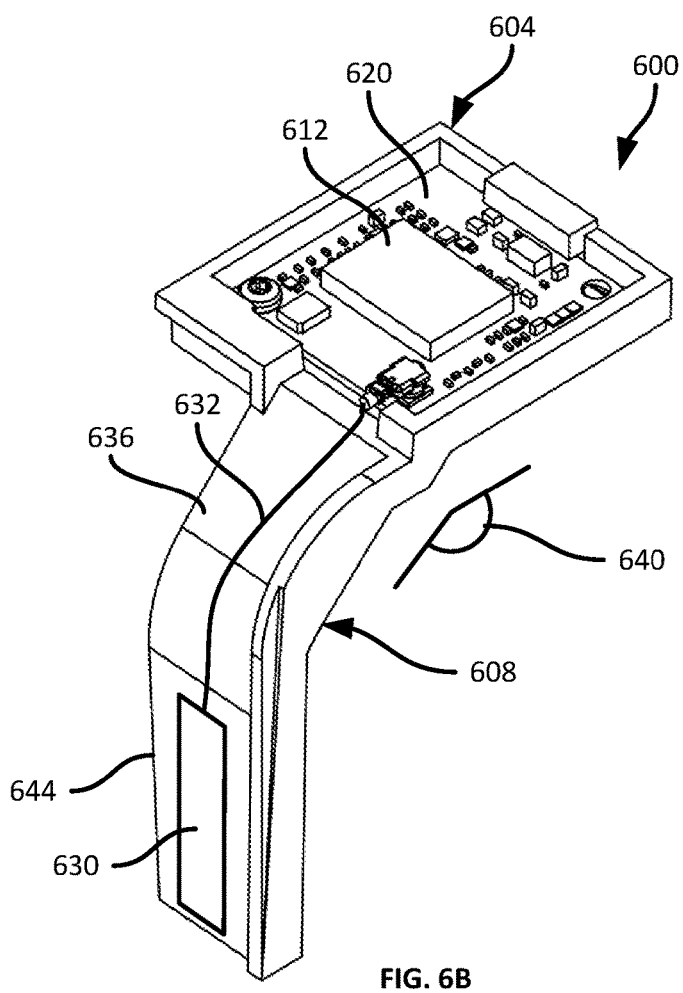

USER-INSTALLABLE WIRELESS COMMUNICATIONS MODULE

BACKGROUND

Media processing devices such as printers may communicate with other computing devices using various distinct communications technologies. However, each user of such devices may only employ a subset of those technologies, e.g. a single one. Equipping such devices with the necessary components for each of a variety of communications technologies may therefore increase the cost of the devices with little or no benefit to each individual user.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 6A is an isometric view of a wireless communications module, viewed from below.

FIG. 6B is an isometric view of the wireless communications module, viewed from above.

Figure 1:
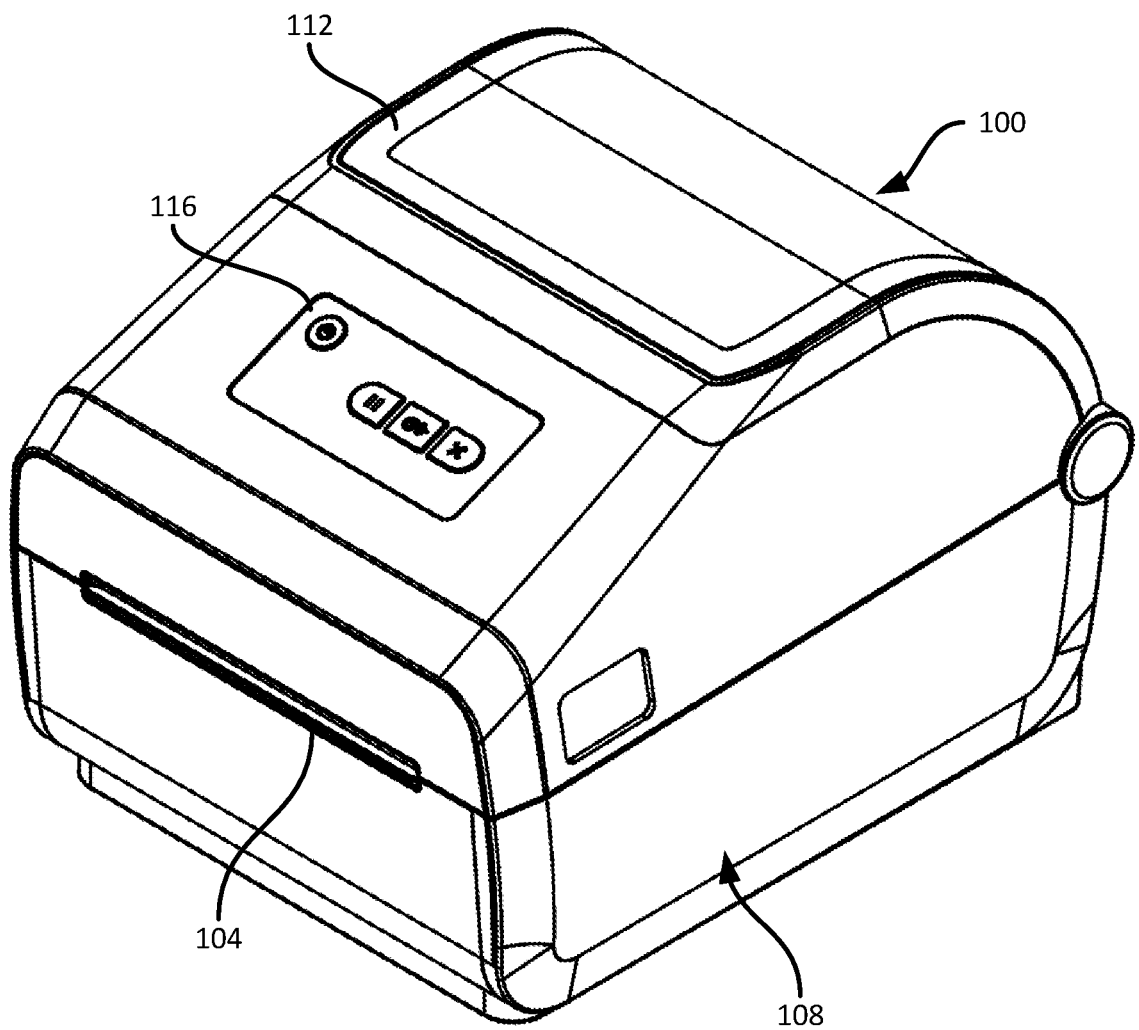
FIG. 1 is an isometric view of a printer viewed from above.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to an installable wireless communications module for a media processing device, the module comprising: a body configured for placement into a chamber of the media processing device, the body including an alignment feature configured to engage with a mating feature within the chamber; an electrical interface supported on the body and configured to engage with a connector of the media processing device disposed within the chamber; a communications controller supported on the body and connected with the electrical interface; an antenna support extending from the body and configured for receipt in a channel extending from the chamber of the media processing device; and an antenna affixed to the antenna support and electrically connected to the controller.

Additional examples disclosed herein are directed to a media processing device, comprising: a housing including a set of exterior walls; a door removable to expose an opening in a first one of the walls; a chamber defined within the housing and accessible via the opening, the chamber configured to receive a wireless communications module; a connector disposed within the chamber, configured to engage with an electrical interface of the module; and a channel defined within the housing and extending from the chamber, to receive an antenna support of the module.

FIG. 1 illustrates a media processing device 100, also referred to herein as a printer 100. The printer 100 can be, for example, a desktop label printer configured to accept media such as a roll of labels, and to apply indicia to the labels, which may then exit the printer 100 via an outlet 104. The outlet 104 is defined at least in part by a housing 108 of the printer 100. The housing 108 includes a set of walls that defining an enclosure containing various components of the printer 100, and defining an interior region for storing the above-mentioned media. The media may be received within the interior of the housing 108 in the form of a cartridge containing a roll of labels, for example.

The printer 100 also includes a lid 112 movably coupled to the housing 108. The lid 112 is movable between the closed position shown in FIG. 1, and an open position (not shown) permitting access to the interior of the housing 108, e.g. to install or replace the media supply.

The printer 100 further includes a control panel 116, e.g. including a power button and other control elements. The printer 100 may receive data from another computing device (not shown) defining a printing task. Such data may be received using a variety of communications technologies. For example, the printer 100 may include one or more of a network port (e.g. an Ethernet port), a local connection port such as a Universal Serial Bus (USB) port, or the like. The printer 100 may also include one or more wireless communication interfaces, such as a Bluetooth™ transceiver or the like. In this example, the printer 100 is equipped for the installation of a wireless communications interface, such as a WiFi module. That is, the printer 100 is manufactured without WiFi connectivity (e.g. according to the 802.11 family of communication standards), but can receive a user-installable module to provide WiFi connectivity to the printer 100. Manufacturing cost and complexity of the printer 100 may therefore be reduced, with the additional cost of WiFi connectivity borne only by those users who require such connectivity.

As discussed herein, the module mentioned above and the printer 100 include various structural features to enable simple (and, if necessary, removal) of the wireless communication module. As will be apparent to those skilled in the art, the module discussed herein may implement wireless communication standards other than those related to WiFi, or may include transceivers for more than one type of wireless communications.

Figure 2:
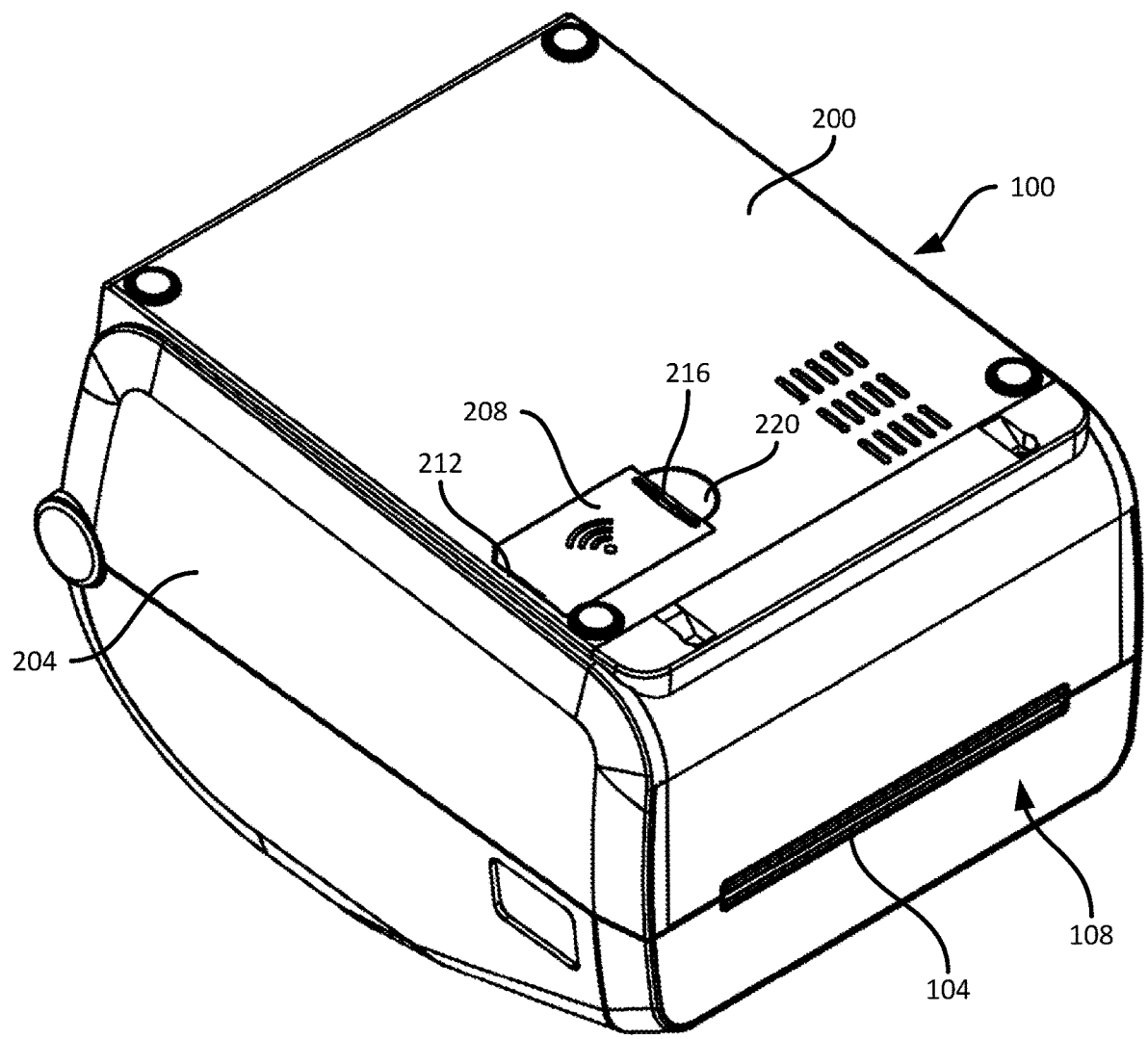
FIG. 2 is an isometric view of the printer of FIG. 1, viewed from the underside thereof.

Turning to FIG. 2, a bottom of the printer 100 is shown, including a bottom wall 200 and a side wall 204 of the housing 108. The bottom wall 200 includes an opening, which in FIG. 2 is covered by a door 208. The opening, when the door 208 is removed, enables access to a chamber defined within the housing 108 into which a communications module can be installed. The door 208, in the illustrated example, includes rigid latching elements at a first end 212, and flexible latching elements at a second end 216 thereof. Therefore, a user may deform the latching elements at the second end 216, e.g. by inserting a finger into a recess 220 defined in the bottom wall 200. Having deformed the latching elements to unlatch the second end 216 from the bottom wall 200, the user can rotate the door 208 about the first end 212 and then remove the door 208.

Figure 3:
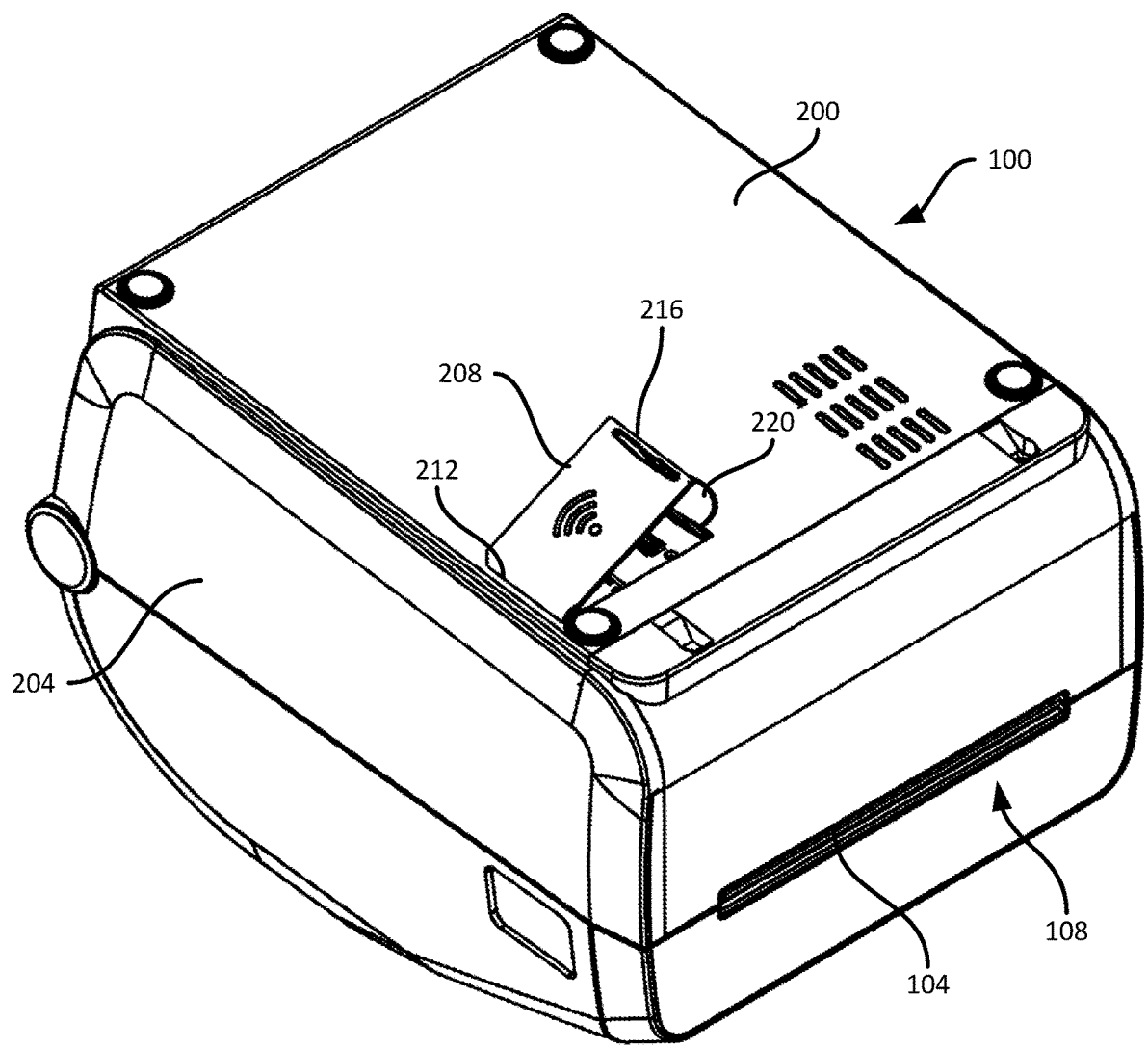
FIG. 3 is an isometric view of the printer of FIG. 2, with a communications module door opened.
Figure 4:
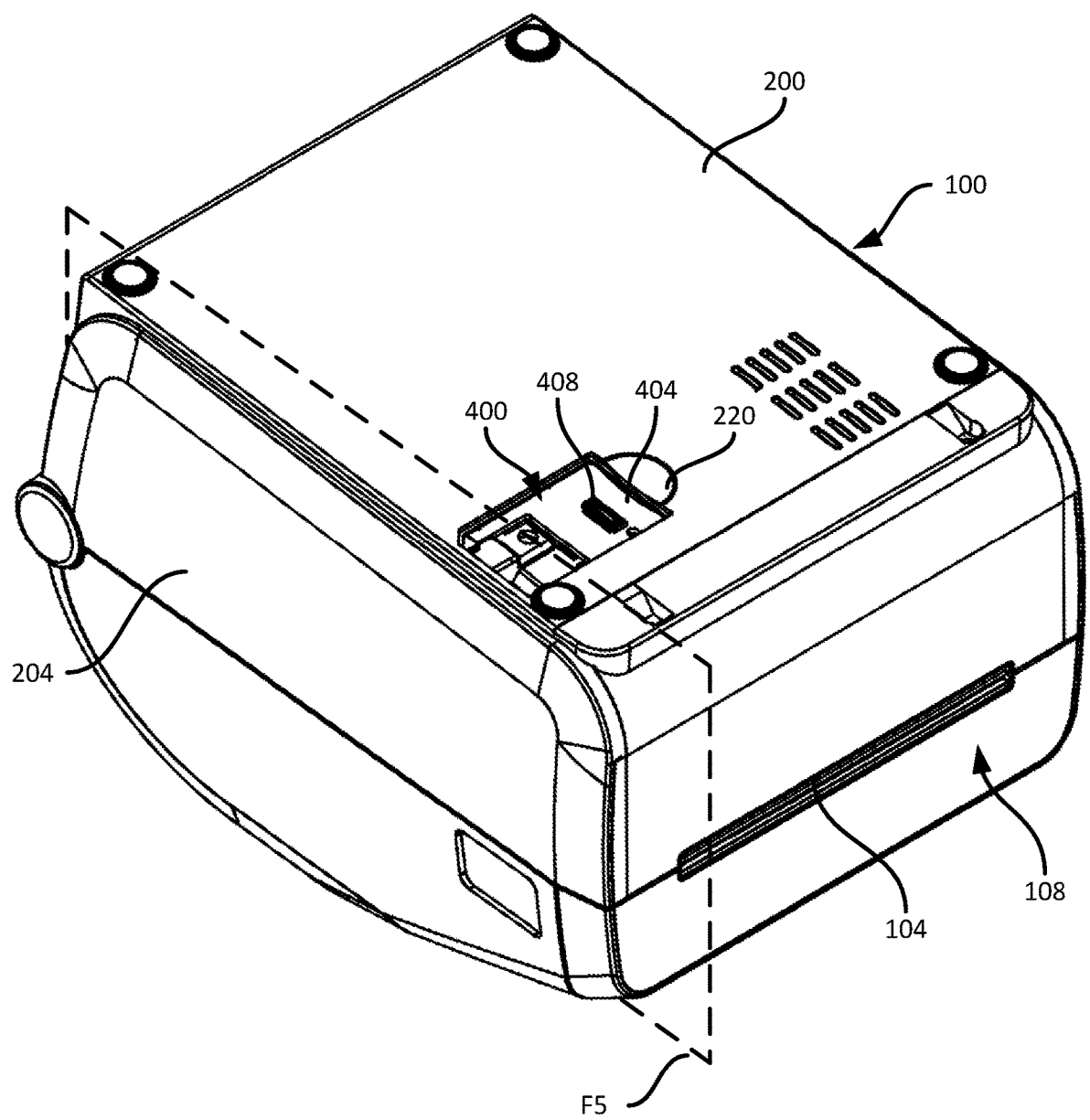
FIG. 4 is an isometric view of the printer of FIG. 3, with the door removed.

FIG. 3 illustrates the printer 100 with the door 208 opened following disengagement of the latching elements at the second end 216 from the bottom wall 200. FIG. 4 illustrates the printer 100 following removal of the door 208. As will be apparent to those skilled in the art, the door 208 may be implemented in various other ways. For example, the door 208 may be fastened to the bottom wall 200 with screws or other fasteners.

As shown in FIG. 4, removal of the door 208 reveals an opening in the bottom wall 200 that enables access from the exterior of the printer 100 to a chamber 400 defined within the housing 108. The chamber 400 is configured to receive the wireless communications module. The chamber 400 includes, in particular, a lower surface 404 carrying a connector 408. When the module is installed in the chamber 400, the connector 408 engages with an electrical interface of the module, in order to electrically connect the components of the module (e.g. a wireless communications controller) with a controller of the printer 100. The lower surface 404 can, as in the illustrated example, be defined by a circuit board supported within the housing 108 adjacent to the bottom wall 200.

Figure 5:
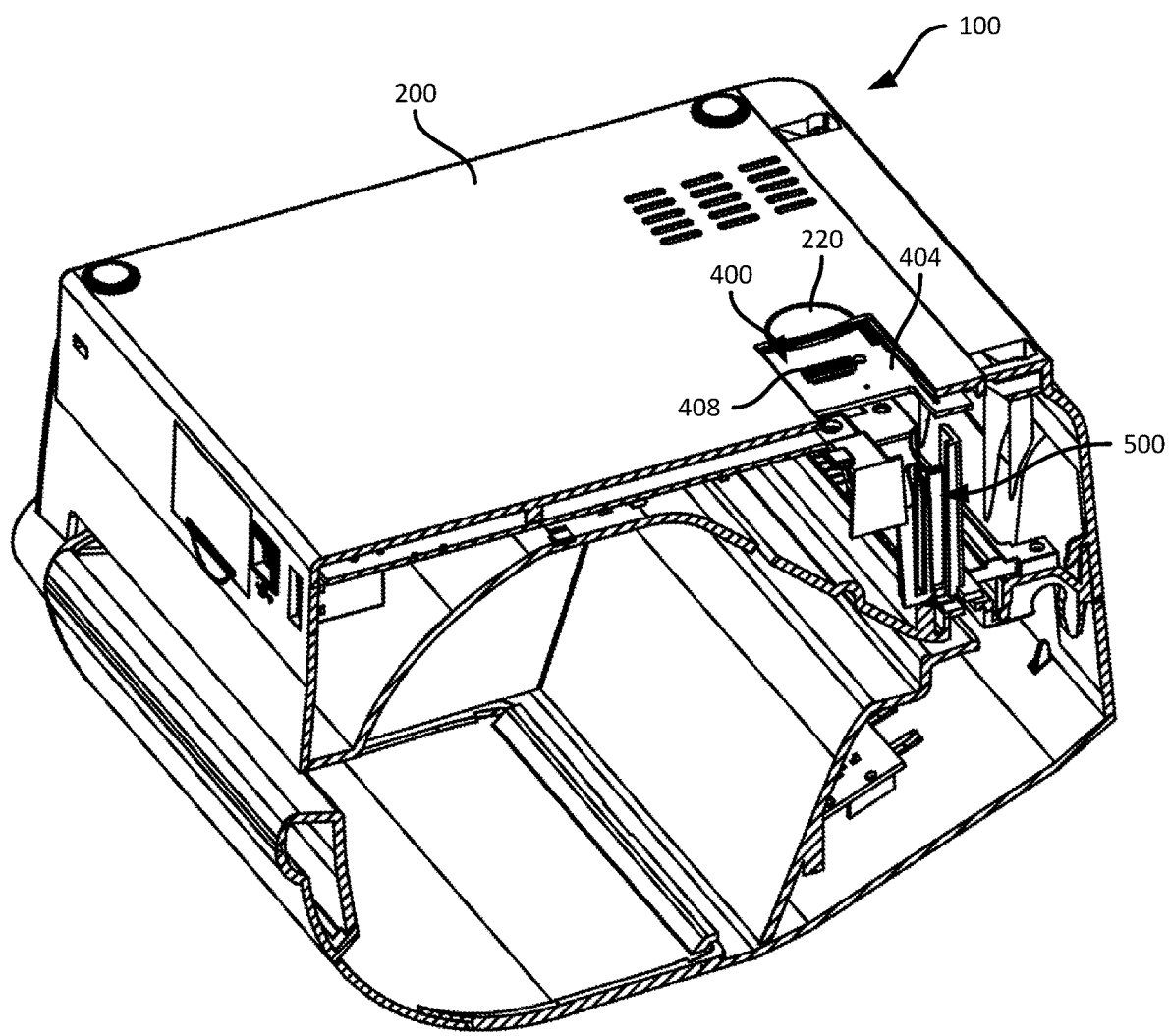
FIG. 5 is a cross section of the printer of FIG. 4.

Turning to FIG. 5, a cross-section of the printer 100 is shown, taken at the plane F5 illustrated in FIG. 4. FIG. 5 reveals that the printer 100 also includes a channel 500 extending away from the chamber 400 substantially at a right angle. The channel 500 accommodates an antenna support of the module, as will be discussed below in greater detail. The interior portion of the printer 100 defining the chamber 400 and the channel 500, as seen in FIG. 5, are not cross-sectioned.

Before further discussion of the chamber 400 and the channel 500, the module itself will be discussed in greater detail with reference to FIGS. 6A and 6B. FIGS. 6A and 6B illustrate a wireless communications module 600 configured to insertion into the chamber 400 and channel 500 mentioned above. The module 600 includes a body 604 configured for placement into the chamber 400, and an antenna support 608 extending from the body 604. The body 604 supports a wireless communications controller 612, e.g. on an upper surface of the body 604. The body 604 further supports an electrical interface 616 on a lower surface of the body 604. The electrical interface 616 is connected with the controller 612 (e.g. via conductive elements of a circuit board 620 (e.g. a printed circuit board (PCB)) on which the controller 612 and the interface 616 are mounted), and is configured to engage with the connector 408 within the chamber 400 when the module 600 is installed within the printer 100. In other examples, the controller 612 itself may also be mounted on the lower surface of the body 604.

The body 604 also includes at least one alignment feature configured to engage with a mating feature within the chamber 400. In particular, the alignment feature in the illustrated example includes an alignment post 624 extending from a lower surface of the body 604 adjacent to the interface 616. The post 624 engages with a corresponding hole in the chamber 400, as will be discussed below.

The body 604 can include additional alignment features. For example, as illustrated, the body 604 includes a second alignment post 628 extending from the lower surface of the body 604 and configured to engage with a second hole in the chamber 400. Either or both of the posts 624 and 628 can, as illustrated in FIG. 6A, include chamfered distal ends to ease fitting of the posts 624 and 628 into the corresponding holes of the chamber 400. In other examples, the alignment features of the body 604 can include holes rather than posts (with the chamber 400 including posts rather than holes), or a combination thereof.

The antenna support 608 supports an antenna 630, which can include a conductive strip of material, a printed circuit, or the like. The antenna 630 can be affixed to a surface of the antenna support 608 by a suitable adhesive, for example. As seen in FIG. 6B, the antenna 630 is connected to the controller 612 via a wire 632, circuit trace, or the like travelling between the antenna 630 and the body 604. The module 600 may also, in some examples, include a ferrite bead between the wire 632 and the board 620.

In the present example, the antenna support 608 includes a proximal portion 636 extending from the body 604 at an angle 640 of more than 90 degrees relative to the lower surface of the body 604. For example, the angle 640 can be about 135 degrees, although various other angles between 90 and 135 degrees, or between 135 and 180 degrees, may also be employed. The antenna support 608 further includes a distal portion 644 extending from the proximal portion 636, at an angle of about 90 degrees relative to the lower surface of the body 604. The proximal portion 636 is therefore at an incline between the body 604 and the distal portion 644, to mitigate against severe bends (e.g. bends of 90 degrees or greater) in the wire 632, which may result in damage to the wire 632.

The antenna support 608, as will be apparent, slides into the channel 500 of the printer 100 when the module 600 is installed. The antenna support 608 can include one or more ridges, such as a ridge 648 illustrated in FIG. 6A extending from the distal portion 644, to engage with corresponding grooves in the channel 500 to guide installation of the module 600 and to provide structural rigidity to the antenna support 608.

As will also be apparent, when the module 600 is installed in the printer 100, the antenna 630 is placed inside the housing 108 and adjacent to the wall 204. That is, the distance between the antenna 630 and the exterior of the printer 100 is minimized, and thus interference between the antenna 630 and other components of the printer 100 may be reduced.

In other examples, the structure of the antenna support 608 and the angle of the antenna support 608 relative to the body 604 may vary depending on the shape of the printer 100 (e.g. to place the antenna 630 adjacent to an outer wall of the printer 100, such as the wall 204), and the shape of the antenna 630 itself. The module 600 can, in some examples, include a cover extending over the body 604 to enclose the controller 612 and other components on the board 620.

Figure 7:
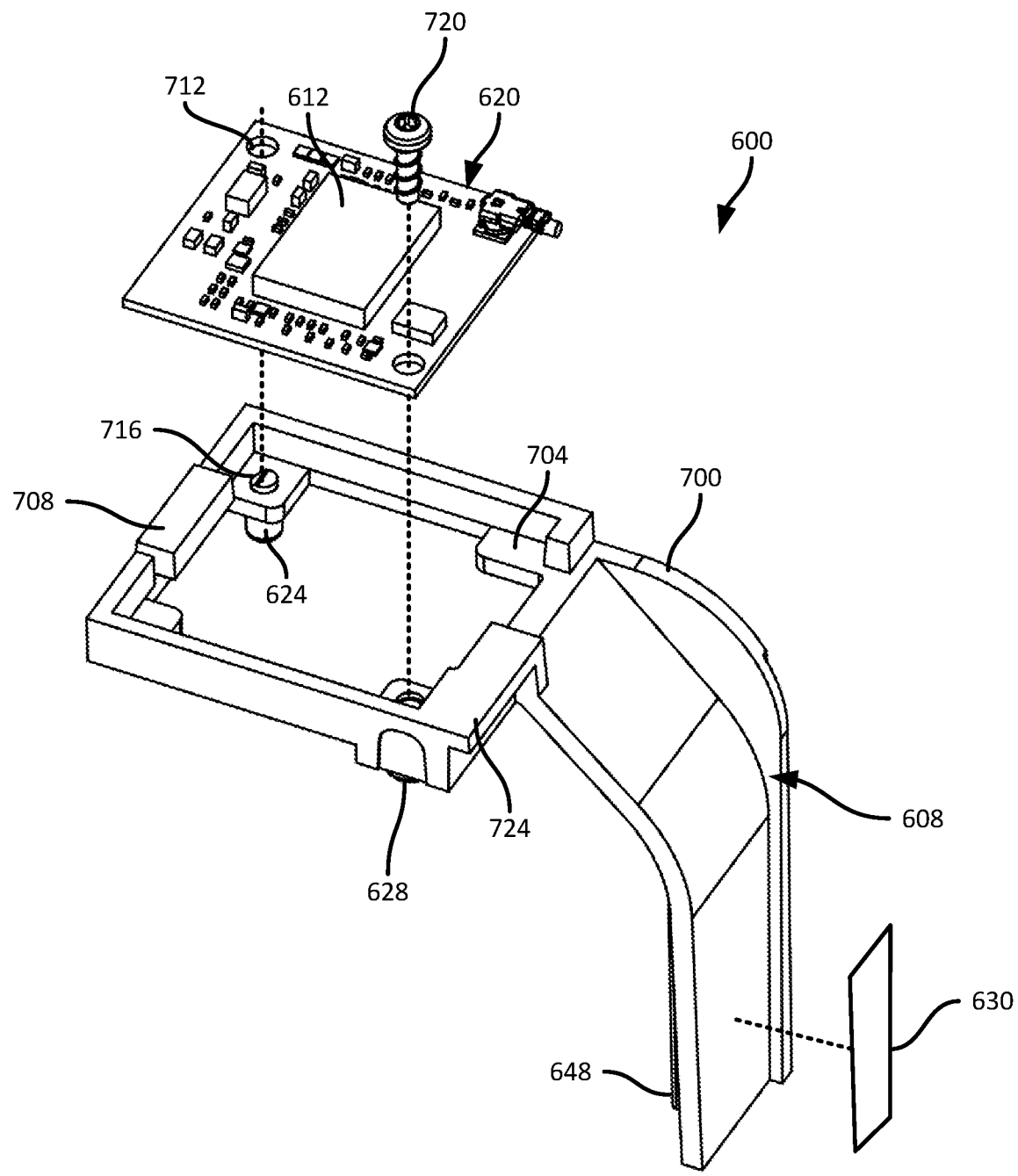
FIG. 7 is an exploded view of the wireless communications module of FIGS. 6A and 6B.

Turning to FIG. 7, an exploded view of the module 600 is shown illustrating an example construction of the module 600. In particular, in the illustrated example the module 600 includes a frame 700, e.g. a single piece of plastic or other suitable material. The frame 700 defines the antenna support 608 and a portion of the body 604. In particular, the frame 700 defines a perimeter of the body 604, including the alignment posts 624 and 628. The perimeter includes support pads 704 for the circuit board 620 carrying the controller 612 and the interface 616 (not visible in FIG. 7). As will therefore be apparent, the circuit board 620 forms the remainder of the body 604.

The circuit board 620 can be affixed to the frame 700 by, for example, placing an edge of the circuit board 620 underneath a ledge 708 to align a hole 712 in the board 620 with a post 716 on the frame 700 and place the underside of the board 620 on the support pads 704. The board 620 may then be fastened to the frame 700 via a fastener such as a screw 720 that engages the frame 700 at an aperture opposite the post 628. The antenna 630 may then be affixed to the antenna support 608, and the wire 632 (not shown in FIG. 7) may then be coupled to the board 620 and the antenna 630, e.g. by soldering.

The module 600 may include additional structural features to facilitate installation or removal into or from the printer 100. For example, the module 600 as illustrated includes a lip 724 at the perimeter thereof, enabling insertion of a fingertip thereunder to facilitate removal of the module 600 from the printer 100.

Figure 8:
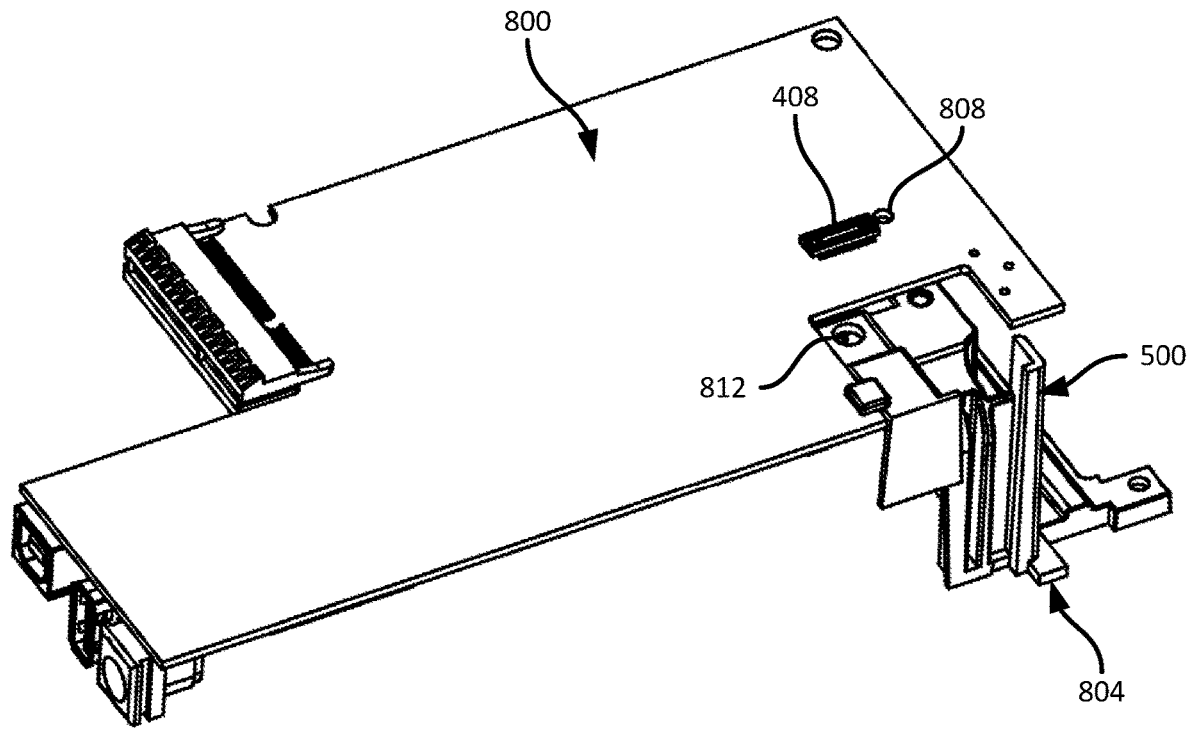
FIG. 8 is an isometric view of certain internal components of the printer of FIG. 5.

Turning to FIG. 8, certain internal components of the printer 100 are shown in isolation. In particular, a PCB 800 carrying the connector 408 (and various other components, omitted here for simplicity), and a chamber frame 804 that defines the channel 500 and a portion of the lower surface of the chamber 400. As will be apparent, the PCB 800 defines the remainder of the lower surface of the chamber 400. The PCB includes a first alignment hole 808 adjacent to the connector 408, for receiving the post 624, and a second alignment hole 812 for receiving the post 628. In this example, the hole 812 is defined by the frame 804, but in other examples the hole 812 may also be defined by the PCB 800.

Figure 9A:
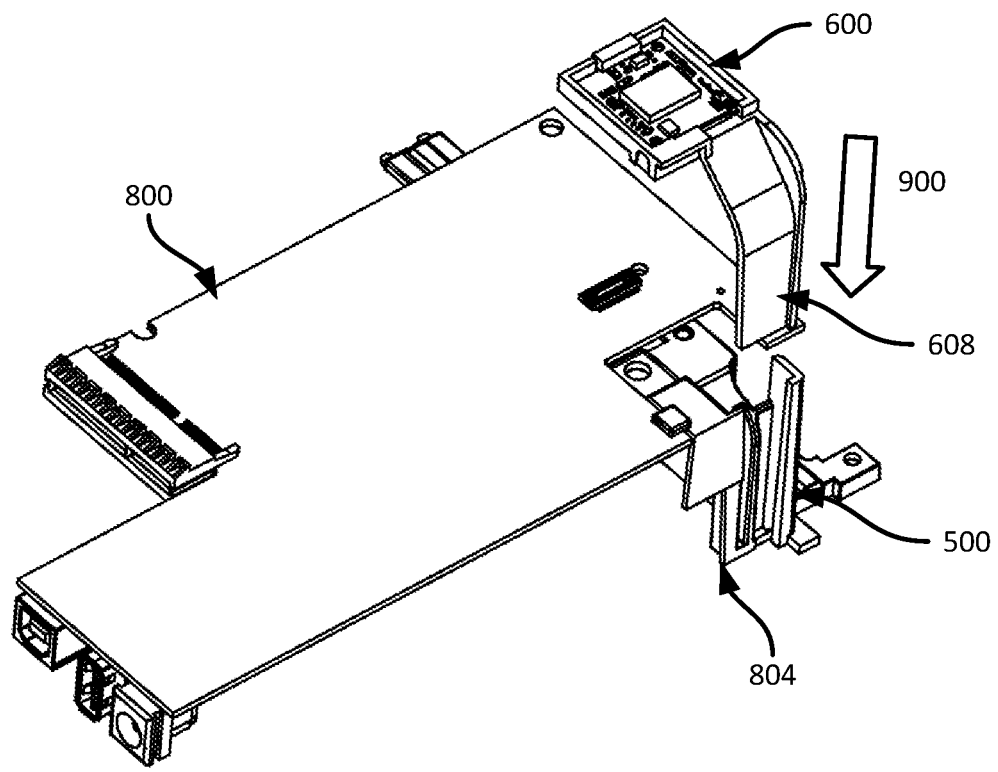
FIGS. 9A and 9B are isometric views of the printer components of FIG. 8 during installation of the wireless communications module of FIGS. 6A and 6B.
Figure 9B:
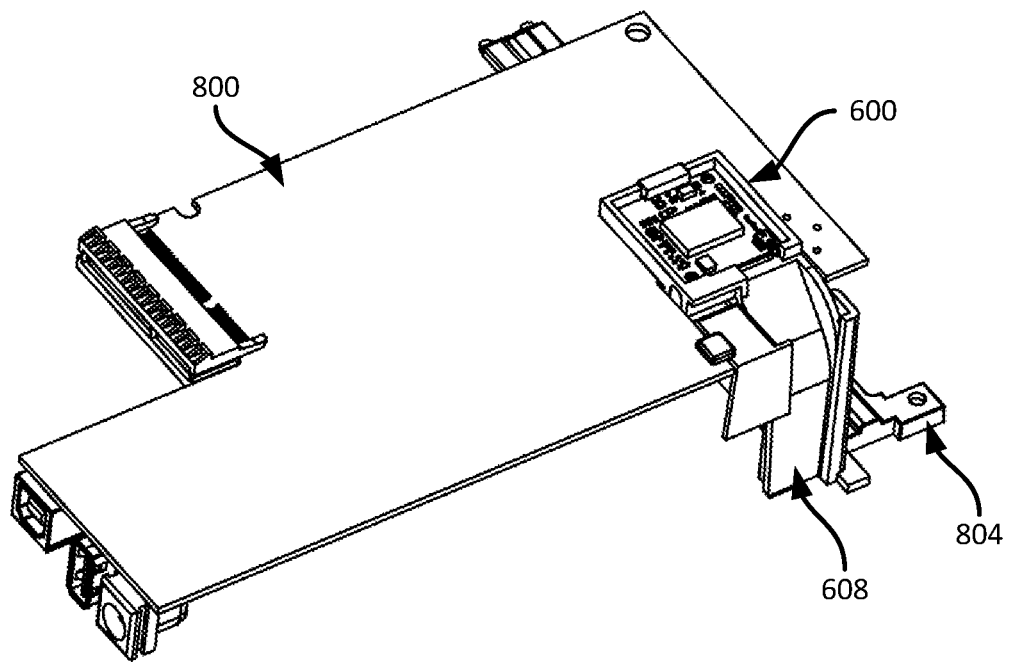

FIGS. 9A and 9B illustrate the installation of the module 600 relative to the PCB 800 and the frame 804. In particular, following removal of the door 208, the module 600 is positioned above the chamber 400 with the antenna support 608 aligned with the channel 500. The module 600 is then inserted downwardly into the chamber 400 and channel 500, such that the antenna support 608 occupies the channel 500, as shown in FIG. 9B. As will be apparent, upon insertion the posts 624 and 628 engage with the holes 808 and 812, respectively, and the interface 616 engages with the connector 408.

Figure 10:
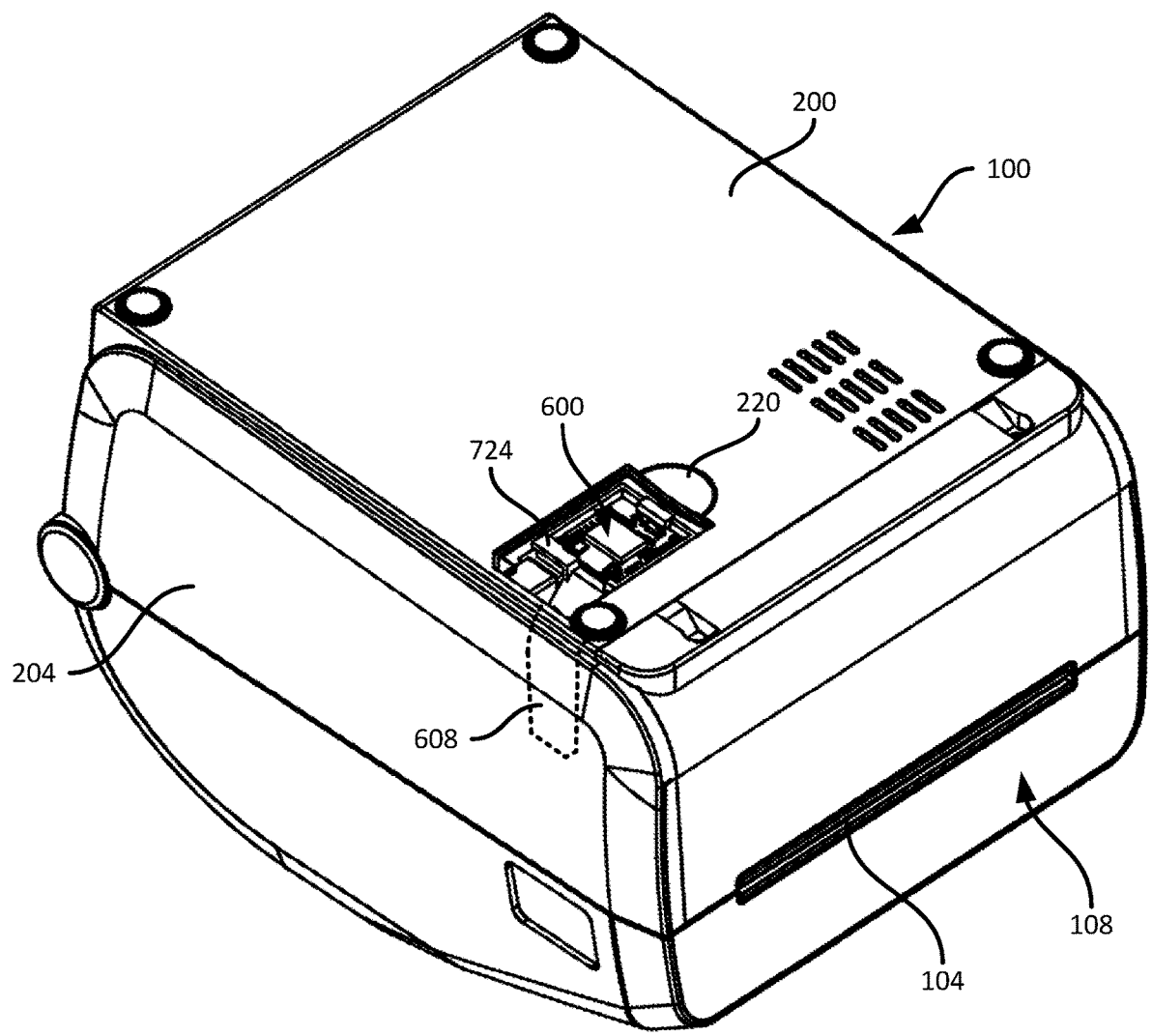
FIG. 10 is an isometric view of the printer of FIG. 4, following insertion of the wireless communications module of FIGS. 6A and 6B.

Turning to FIG. 10, the printer 100 is shown with the module 600 installed, prior to replacement of the door 208. As seen in FIG. 10, the body 604 of the module 600 occupies the chamber 400, and the antenna support 608 (illustrated in dashed lines) lies behind the wall 204 of the housing 108.

Following insertion of the module 600 as shown in FIGS. 9B and 10, the door 208 is replaced to cover the opening in the wall 200. The door 208 can also, when installed, exert downward pressure on the module 600 (e.g. by pressing on the ledge 708) to drive the interface 616 into consistent engagement with the connector 408. The door 208 can thus provide such consistent engagement without the need for additional fasteners to be applied to the module 600, allowing installation and removal of the module 600 to be toolless.

As will be apparent, the module 600 can also be removed from the printer 100 by reversing the above process. That is, the door 208 is removed, the module 600 is withdrawn from the chamber 400 and channel 500, and the door 208 is replaced to cover the opening in the wall 200.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising." "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately". "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A media processing device, comprising:
a housing including a set of exterior walls;
a door removable to expose an opening in a first one of the walls;
a chamber defined within the housing along the first one of the walls and accessible via the opening, the chamber configured to receive a body a of a wireless communications module that includes a wireless communication controller;
a connector disposed on a first surface within the chamber that is parallel to the first one of the walls, the connector faces in a direction towards the first one of the walls and is configured to engage with an electrical interface of the wireless communication module; and
a channel defined within the housing and extending from the chamber, away from the first one of the walls in an opposite direction relative to the direction that the connector faces, and along a second one of the walls, the second one of walls being adjacent to the first one of the walls, the channel configured to receive an antenna support of the module.

2. The media processing device of claim 1, wherein the chamber includes an alignment feature to engage with a corresponding feature of the wireless communications module.

3. The media processing device of claim 2, wherein the alignment feature is a hole.

4. The media processing device of claim 3, wherein the hole is adjacent to the connector.

5. The media processing device of claim 2, wherein the chamber includes a second alignment feature.

6. The media processing device of claim 1, wherein the channel extends away from the first one of the walls substantially perpendicular to the first one of the walls.

7. The media processing device of claim 1, wherein the channel is disposed within the housing, adjacent to the second one of the side walls, the channel being formed between a portion of a frame within the housing and the second one of the side walls as a guide within which the antenna support is received.

8. The media processing device of claim 1, wherein the channel includes a groove configured to receive a ridge of the antenna support.

9. The media processing device of claim 1, wherein the door is configured to drive the wireless communications module into the chamber when installed over the opening.

10. The media processing device of claim 1, wherein the connector is supported by a circuit board within the housing; and
wherein a portion of the circuit board supporting the connector defines an inner surface of the chamber.

11. A media processing device, comprising:
a housing including a set of exterior walls;
a door removable to expose an opening in a first one of the walls;
a chamber defined within the housing along the first one of the walls and accessible via the opening, the chamber including an electrical connector disposed on a first surface of the chamber that is a parallel to the first one of the walls, the electrical connector faces in a direction towards the first one of the walls;
a channel defined within the housing, the channel open to and extending from the chamber, away from the first one of the walls in an opposite direction relative to the direction that the electrical connector faces, and along a second one of the walls, the second one of walls being adjacent to the first one of the walls;
the chamber and the channel configured in combination to receive a wireless communications module that includes a body and an antenna support of the module extending from the body, the channel is configured and dimensioned to receive the antenna support via the chamber and the chamber configured and dimensioned to receive the body.

12. The media processing device of claim 11, wherein the chamber and the channel form an L-shaped cavity in the housing.

13. The media processing device of claim 11, wherein a proximal end of the channel corresponding to a transition from the chamber to the channel is inclined at a non-zero angle relative to the chamber and to a distal end of the channel.

14. The media processing device of claim 11, wherein the chamber and channel are configured and dimensioned such that the antenna support is received within the chamber before the body is received in the chamber.

* * * * *